Jan. 3, 1950
H. L. MILLS
2,493,636
COMBINED SLIDE PROJECTOR CASE AND MOUNTING
WITH FORCED AIR COOLING DEVICE
Filed Feb. 5, 1949
2 Sheets-Sheet 1
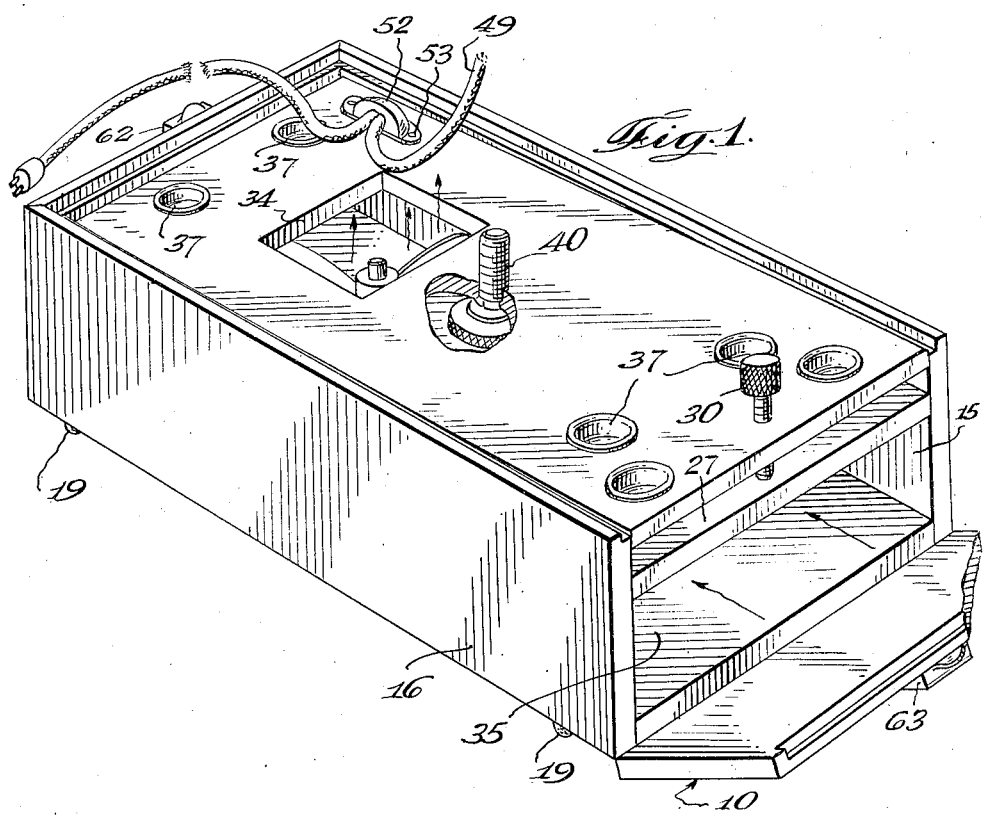
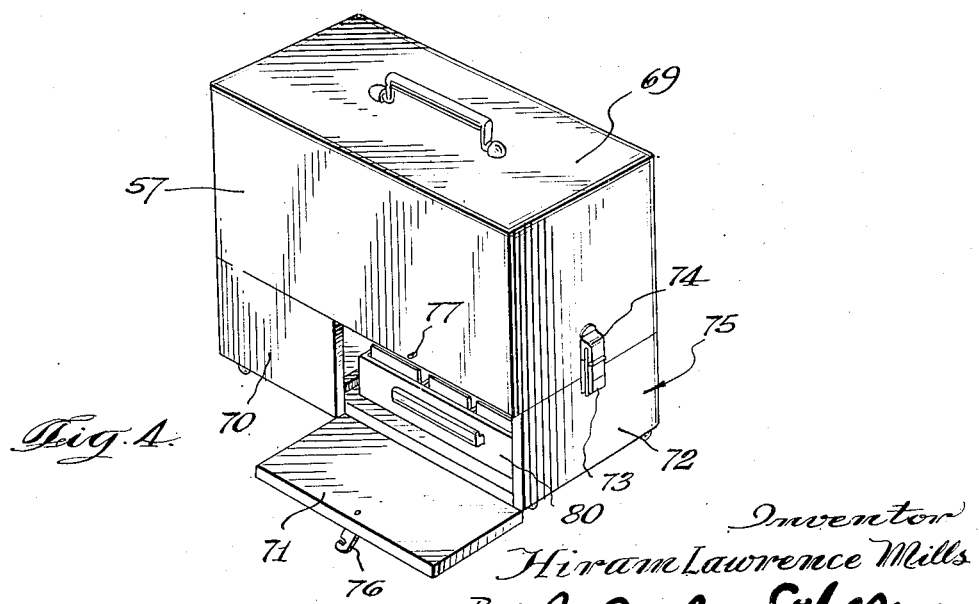
Inventor
Hiram Lawrence Mills
By J. Irving Silverman
Attorney Jan. 3, 1950           H. L. MILLS           2,493,636
COMBINED SLIDE PROJECTOR CASE AND MOUNTING
WITH FORCED AIR COOLING DEVICE
Filed Feb. 5, 1949                              2 Sheets-Sheet 2
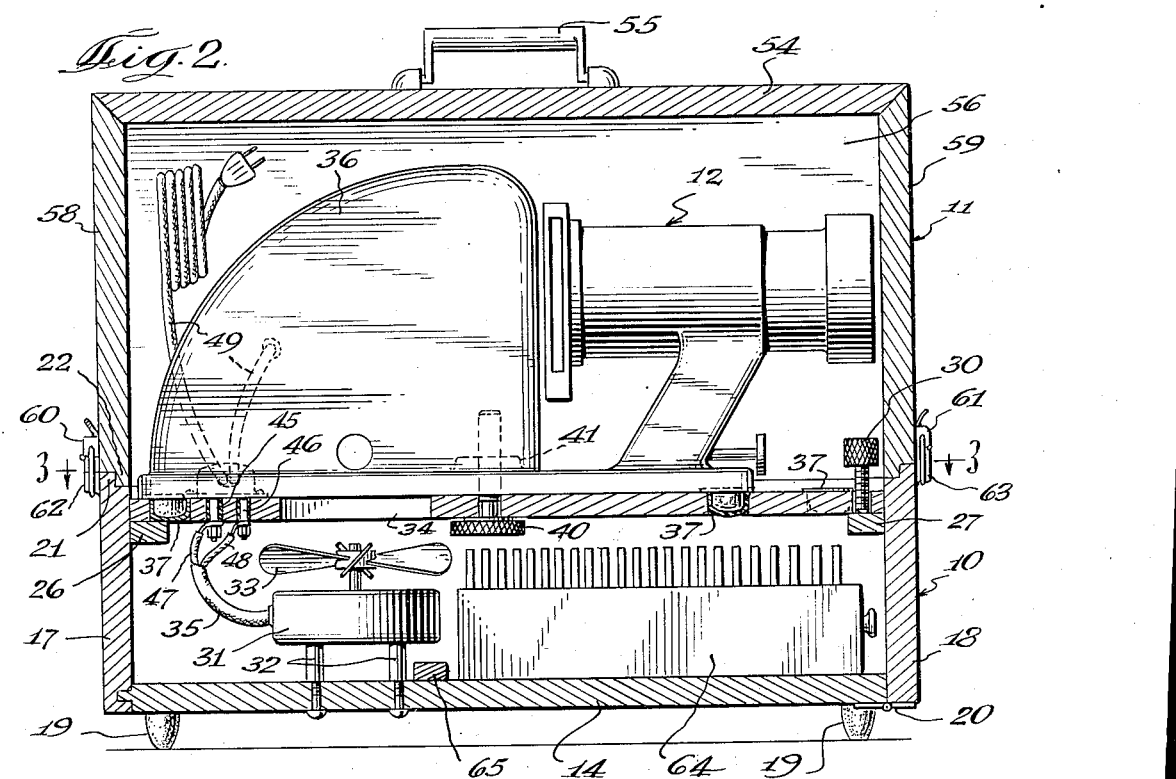
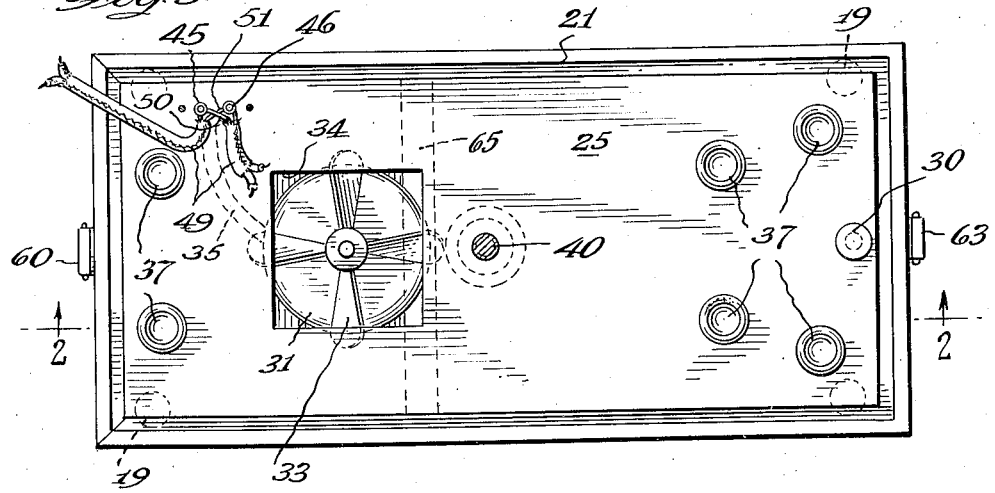
Inventor
Hiram Lawrence Mills
By Jo Irving Silverman
Attorney Patented Jan. 3, 1950

2,493,636

UNITED STATES PATENT OFFICE 2,493,636

COMBINED SLIDE PROJECTOR CASE AND MOUNTING WITH FORCED AIR COOLING DEVICE

Hiram Lawrence Mills, Texas, Tex.

Application February 5, 1949, Serial No. 74,824

3 Claims. (Cl. 88—24)

This invention relates to a combined carrying case, and support for a film projector, and more specifically is concerned with the provision of a base adapted to support a projector thereon, and cool the heated light source thereof by means of a forced current of air projected by means of a blower contained within the case.

The modern projector, either for still transparencies or for motion pictures, must utilize a high intensity light source in order to fulfill the requirements of modern projection standards. In practically all cases, the light source consists of a relatively high wattage electric lamp of the incandescent type, the heat from which must be dissipated as the lamp is being used. This is essential for the protection of the film, and the operator, as well as for the promotion of long life of the equipment. My invention proposes the provision of efficient cooling means combined with a support base for the projector as well as a carrying case and storage space for the accessories thereof.

I am aware of the existence of projectors having air cooling provided by blowers and fans, especially in the case of motion picture projectors. It is desired to point out however that the number of such projectors is extremely small compared to the number of those projectors which have no forced air cooling means, but which depend upon convection and radiation for the dissipation of heat. I especially refer to slide projectors of an extremely economical construction, and it is especially for this type of projector that the devices contemplated by my invention have been devised. Many persons not capable of purchasing additional projecting equipment or desiring to discard satisfactorily operating equipment will be enabled to utilize such equipment in comfort and prolong the life thereof as well as the longevity of their transparencies by reason of my invention.

It is accordingly the principal object of my invention to provide a device capable of accomplishing those functions which have been set forth above.

In addition to the disadvantages occasioned by the great expense heretofore attendant upon the obtaining of projection equipment with built in blowers and fans, such equipments have always been large and bulky and difficult to carry, whereby same have rarely been truly portable.

Another object of my invention is to provide a structure which, besides making available all of the advantages of forced air cooling, of the light source, will be extremely portable and hence eliminate the disadvantages of prior projectors. In addition to the above, it is a part of the above object to provide storage space in the structure for accessories of the projector.

One of the objects of this invention is to provide a device of the character described which will comprise a combined base for supporting a transparency projector thereon, cooling the same, providing storage space for accessories of the projector, and the entire device having a cover cooperating with the base for retaining the entire device assembled when the same is being carried.

A further object of the invention is to provide a novel base for a projector which will have the top wall thereof tiltable.

Still other objects of the invention reside in the constructional details of my new device.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of this invention, there is illustrated in the accompanying drawings, a preferred embodiment thereof, from an inspection of which, when considered in connection with the following description, this invention, its mode of construction, assembly and operation, and many of its advantages should be readily understood and appreciated.

Referring to the drawings in which the same characters of reference are employed to indicate corresponding or similar parts throughout the several figures of the drawings:

Fig. 1 is a perspective view of a base constructed in accordance with my invention, there being no projector attached to the base.

Fig. 2 is a sectional view through the combined base and cover, and showing the projector associated therewith, the cover being attached as in carrying the entire assembly.

Fig. 3 is a top plan view of the base with the cover and projector removed.

Fig. 4 is a perspective view of a modified form of my invention.

Generally, my invention comprises a base, preferably formed as an elongated box-like structure having an end wall or a side wall capable of swinging open to admit air into the interior of the structure. The top wall of the structure has an opening therein and a blower is provided in the base arranged to draw air into the base from the open side and force it out through the opening. The opening is adapted to be positioned immediately below the lamp of a projector, the upper wall being provided with means for removably mounting the projector thereon. The upper wall of the base is also provided with means for adjusting the tilt thereof in order to enable tilting of the projector during use. Means are provided for connecting the electric motor of the blower in parallel with the projector, for seating the projector, for covering the projector in order to carry same, and for locking the open side in closed condition while carrying same. The base is also capable of carrying accessories.

Referring now to the details of the invention, the reference character 10 designates generally the base of my invention, 11 designates generally the cover therefor, and the reference character 12 designates generally a projector adapted to be supported upon the base and cooled by the blower.

The base 10 consists of a bottom wall 14 and side walls 15 and 16, having end walls 17 and 18. The walls may be formed of any suitable material such as for example wood, which may be treated in any desirable manner to render same durable and attractive. As will be noted, the structure 10 is oblong in shape and the walls 15, 16, and 17 are permanently secured to the bottom wall which is preferably provided with feet 19 of some soft material to prevent the marring of surfaces upon which the device may be placed. The end wall 18 is hinged at the bottom thereof by the hinges 20 and adapted to swing open as shown in Fig. 1 in order to give access to the interior of the base 10. The top edges of all the sides of the base are rabbeted as shown at 21 in order to enable the corresponding edges 22 of the cover member 12 to fit thereon in a manner to be described.

The top wall 25 of the base rests upon bracket members 26 and 27 which are secured within the base spaced below the upper edges 21 thereof. The bracket member 26 is secured to the inner surface of the left end wall 17 while the bracket member 27 is secured at the opposite end of the base 10 between the ends of the side members 15 and 16. Obviously the bracket member is free of the end wall 18 which must be able to swing open as explained. The top wall 25 is intended to support the projector 12 thereon, and the weight of the projector will retain the top wall 25 in position whereby same need not be fastened to the base. This may, however, be done in case it is not intended that said wall be tiltable. I prefer however that same merely have a firm fit within the confines of the walls 15, 16, 17, and 18. At one end of the wall 25 I provide a thumb screw 30 which is screw-threaded through the wall 25 and has its end bearing against the top of the bracket member 27 so that the turning of the screw will raise or lower the affected end of the wall 25 whereby the same will tilt about the opposite end which is resting upon the bracket member 26. In Fig. 1 the wall 25 is shown partly tilted up.

The inexpensive type of projector with which my invention is especially concerned (although not being limited thereto) may not have a tilting mechanism as a part thereof, and many such deficient devices are sold in the interests of economy. The tilting arrangement described herein thus provides in addition to the many advantages inherent in my broad structure, a feature which is found for the most part in expensive projection devices.

An electric motor 31 is mounted within the base 10 upon the spacers 32 which are secured to the bottom wall 14 of the base 10 having a fan or other blowing device 33 secured to the rotating shaft thereof and arranged to project air upwardly. The upper wall 25 is provided with an opening 34 immediately above the blower 33 whereby air blown upwardly may escape from the interior chamber designated 35. The position of the blower 33 and the opening 34 are chosen to be directly beneath the light source of the projectors which are intended to be mounted upon the base in order to efficiently cool the same. The projector 12 which is here illustrated has the lamp thereof contained in a housing 36 which, as will be observed in Fig. 2 is immediately above the opening 34 when the projector is attached in place.

The upper wall 25 is also provided with small cup members 37 positioned to receive the feet 38 of the projector 12. A plurality of these cup members 37 may be provided at predetermined positions in order to accommodate the differently positioned feet of the types of projectors with which the apparatus is intended to be associated. The projector 12 is held in position by means of a thumb screw 40 loosely mounted in the center of the wall 25 and of a type and size to be engaged within the standard tripod mounting socket 41 with which practically all projectors are provided. The cup members 37 are below the surface of the upper wall 25 so that projectors which have no feet will be secured in position only by means of the thumb screw 40.

In order to provide electric current for the operation of the motor 31, any suitable connection may be provided. I prefer that the extension cord supplying the projector and usually having a control switch therein be utilized for both purposes. Thus the switch controls the motor and projector at the same time. The preferred manner of doing this is illustrated. I mount suitable binding posts 45 and 46 upon the upper wall 25 insulated therefrom. The leads 47 and 48 from the motor 31 are electrically engaged with the bottom ends of the respective binding posts 45 and 46. The electric extension cord 49 leading from the projector is bared to expose the component wires 50 and 51 and these are electrically engaged with the upper ends of the respective binding posts 45 and 46 thereby connecting the motor 31 in parallel with the lamp of the projector 12. The extension cord 49 need not be severed. Suitable insulation may be provided to prevent short circuiting and the upper ends of the binding posts 45 and 46 with the connected wires 50 and 51 may be covered by a protective insulating cap 52 to prevent the user from contacting the same, which cap may be attached to the upper wall 25 by screws 53. In Fig. 1 the cap 52 is shown in perspective and in Fig. 3, the cap has been removed. Any other manner of connecting the wires may be used, such as for example providing the upper ends of winding posts 45 and 46 with sharp ended prongs, and impaling the respective wires 50 and 51 thereon so that the prongs extend through the insulation and engage the wires.

The cover member 11 has a top wall 54 to which is secured the carrying handle 55, side walls 56 and 57, and end walls 58 and 59. The bottom edges of the walls 56, 57, 58, and 59 are rabbeted at 22 in order to enable the cover member 11 to fit over and be seated upon the base. End walls 58 and 59 are respectively provided with the halves 60 and 61 of spring clasps, the other halves 62 and 63 being secured to end walls 17 and 18 respectively. Thus the spring clasps serve to hold the cover member 11 upon the case 10.

When the base is being utilized, the cover member is removed from the same by releasing the clasps in the well-known manner. Obviously any similar method of securing the cover member to the base may be utilized. In the embodiment illustrated, the half 63 is secured to the end wall 18, which, it will be recalled, is intended to swing open about the hinges 20 when the device is being used. In the arrangement described, therefore, when the case is arranged to be carried with the cover member 11 properly in place, the wall 18 is closed and cannot open, whereby it is practically impossible for same to accidentally swing open. The cover member 11 and its associated clasps therefore serves three purposes, namely—the protection of the projector 11 and covering of the base 10, the provision of means to enable the device to be carried, and the prevention of opening of the wall 18.

When the wall 18 is opened to admit air into the chamber 35, the chamber must be unobstructed to permit a strong draft of cooling air. The space within the chamber 35 is ideally suited for the storing of accessories and apparatus to be used with the projector 12 which can be removed when the projector is to be used. Thus the retaining of the door or wall 18 closed by the cover member 11 while the entire assembled device is being carried, also prevents dropping of said accessories or apparatus. In the illustrations I have shown a slide file 64 disposed in the chamber 35 and adapted to be removed when the projector 12 is being used. In order to prevent the slide file 64 from being pushed against the electric motor 31 and blower 33 a stop member 65 is secured to the bottom wall 14, as shown in Fig. 2.

In Fig. 4 there is shown a modified form of my invention with which I have had success. Instead of the end wall opening as does that of the heretofore described embodiment, there is provided a side wall have two parts, one part 70 being fixed and the second part 71 being hinged to open as shown in the illustration. The end wall 72, corresponding to the wall 18 of Fig. 1 is now permanently affixed to the base 75, although the method of attaching the cover member 69, shown as having identical construction with that utilized in the above described embodiment, is the same as described. The wall 72 and the opposite end wall (not shown) are provided with clasp halves 73 to cooperate with those halves 74 provided on the cover member. The wall 71 is here shown having a latch 76 for securing the wall 71 closed in cooperation with a pin 77. In accordance with a described feature of my invention, however, the clasp halves 73 and 74 may be provided on the long side of the apparatus between the side wall 78 of the cover member and the door 71 so that securing the cover in place will lock the door 71 against opening, preventing the slide file 80 from falling out. In all other respects, the base 75 is identical with the base 10.

It is believed that this invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of this invention as defined in the appended claims.

What is claimed and desired to be secured by Letters Patent of the United States is:

1. A combination carrying case and support for a slide projector including a base for supporting the projector both while using or carrying the same, said base comprising a cooling chamber and having a blower therein, means leading cooling air from the chamber to the projector, said chamber having a hinged wall at one side thereof adapted to be closed during non-use of the projector and enabling the chamber to be used for storing equipment for the projector, and adapted to be opened when the projector is in use and the equipment removed to serve as air inlet to said chamber, and said case having a cover including a carrying handle and means enabling the cover removably to be attached to the base while covering the projector, comprising clasps, said hinged wall adapted to be secured in closed position by at least one of said clasps only when the cover is so attached to the base.

2. In a combined carrying case and support for a slide projector, a base for supporting the projector both while using or carrying same, said base comprising a cooling chamber and having a blower therein, means leading cooling air from the chamber to the projector, and means for admitting cooling air from the atmosphere to the chamber, said case having a cover including a handle, and means enabling the cover removably to be attached to the base while covering the projector, said chamber having a top wall, means for securing the projector to the said top wall for either carrying or using same, the wall being tiltable to enable vertical changes in the projecting direction of the projector, and said wall having said cooling air leading means provided therein as a part thereof, said tiltable top wall having means for securely holding said projector against jarring motion while carrying said case, means for causing said top wall to assume any desired angle of tilt without disengaging said projector, said means comprising a thumb screw threaded through one end of the top wall and engaging against a portion of the chamber.

3. In a combined carrying case and support for a slide projector, a base for supporting the projector both while using or carrying same, said base comprising a cooling chamber and having a blower therein, means leading cooling air from the chamber to the projector, and means for admitting cooling air from the atmosphere to the chamber, said case having a cover including a handle, and means enabling the cover removably to be attached to the base while covering the projector, said chamber having a top wall, means for securing the projector to said top wall for either carrying or using same, said means including recesses in said top wall coinciding with legs on the projector for positioning said legs therein, said top wall having a central recess adapted to engage a threaded member whereby the projector is rigidly secured to the top wall by means of said threaded member, the wall being tiltable to enable vertical changes in the projection direction of the projector, means for tilting said top wall attached to said wall, said means comprising a thumb screw threaded through one end of the top wall and engaging against a portion of the chamber, and said wall having said cooling air leading means provided therein as a part thereof.

HIRAM LAWRENCE MILLS.

REFERENCES CITED

The following references are of record in the file of this patent:

UNITED STATES PATENTS

| Number | Name | Date |
|---|---|---|
| 1,351,765 | Koch | Sept. 7, 1920 |
| 1,716,322 | Proctor | June 4, 1929 |
| 1,873,016 | Oplinger et al. | Aug. 23, 1932 |
| 1,966,351 | Tint | July 17, 1934 |
| 2,139,152 | Freimann | Dec. 6, 1938 |
| 2,160,890 | Mulch | June 6, 1939 |
| 2,268,450 | Haggett | Dec. 30, 1941 |
| 2,281,988 | Osterberg et al. | May 5, 1942 |